Jan. 20, 1970     T. T. BAKONDY ET AL     3,490,437
EMBRYONIC ORGAN CELLS IN A STATE OF PRESERVATION AND METHODS
FOR PRESERVING THE SAME

Filed Oct. 17, 1966     2 Sheets-Sheet 1

INVENTORS
TAYLOR A. OSTEN
THOMAS T. BAKONDY

BY *McCoy, Greene and TeGrotenhuis*

ATTORNEYS

INVENTORS
TAYLOR A. OSTEN
THOMAS T. BAKONDY
BY McCoy, Greene and
TeGrotenhuis
ATTORNEYS United States Patent Office 3,490,437
Patented Jan. 20, 1970

3,490,437
EMBRYONIC ORGAN CELLS IN A STATE OF PRESERVATION AND METHODS FOR PRESERVING THE SAME
Thomas T. Bakondy, Perrysburg, and Taylor A. Osten, Sylvania, Ohio (both of 1456 Secor Road, Toledo, Ohio 43607)
Filed Oct. 17, 1966, Ser. No. 587,034
Int. Cl. A61j 17/00, 25/02
U.S. Cl. 128—1                 8 Claims This invention relates to a method of preserving embryonic organ cells, and to embryonic cells in a state of preservation and in a state such that they can be readily reconstituted in the presence of the embryonic serum or plasma. It particularly relates to such compositions for preserving such compositions suitable for treating livestock or other four-legged animals that have been subjected to lethal gamma radiation.

Embryonic cells have been successfully used, particularly in Europe, for intramuscular injection into animals suffering from degeneration of organs as caused by age, gamma radiation and the like. In accordance with one method of use, the embryo at a late stage of development is removed by Caesarean section under strict surgical aseptic technique from the mammalian mother (usually a cow or sheep) and the desired organs rapidly separated from the embryo, comminuted for injection, and injected intramuscularly into the animal that is to be treated. The results have been dramatic in many instances, such as in the case of arteriosclerosis wherein placenta cells are used in the treatment, in the case of radiation sickness where the combination of bone marrow and spleen cells, with or without liver cells are used in the treatment, etc. All of the above operations must, however, be accomplished within a few minutes and before changes or deterioration of the cells have set in. The difficulties inherent in such a treatment with fresh embryonic cells is obvious and minimizes the advantages.

Within recent years a process has been evolved for preparing embryonic-organ cells in a more convenient form for use for treating desired animals. In accordance with that method, the uterus is removed from the living mother and under strict surgical aseptic conditions, the embryo is rapidly removed, desired organs segregated and then quickly frozen or cooled to extremely low temperature, vacuum dried at such low temperature, comminuted and packaged under vacuum in glass ampules. When it is desired to utilize the ampules in the treatment of a sick animal, the powdered material is mixed with a solution, such as Ringer's solution and injected deep intramuscularly into the animal.

While the freeze dried cells are effective in the treatment of degenerative diseases of animals, they have not been nearly as efficient as the fresh embryonic cells.

It is an object of the present invention to provide packaged embryonic organ cells that may be stored for long periods of time and which may be rapidly reconstituted to provide superior efficiency to those heretofore produced.

It is a further object of the present invention to provide a method of processing embryonic organ cells so that they may be reconstituted to rival or substantially equal fresh embryonic cells in efficiency.

Other objects will be apparent from the following description of the invention illustrated in part by the drawing, in which FIGURE 1 is an elevational sectional view of a unitary syringe package containing embryonic cells and plasma constituents and suitable for rapid mixing of the embryonic cells with plasma and for injecting the reconstituted cells into the muscle of an animal to be treated.

Figure 1:
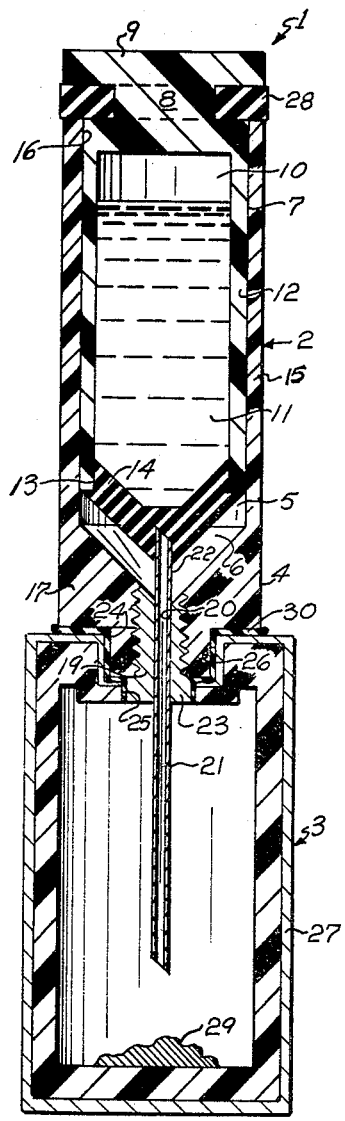

Cells of animal organs are recognized to be minute manufacturing plants where new chemical ingredients are produced from materials supplied through the blood stream. The cells are essentially double walled. They have an outer continuous layer substantially lined with extremely minute pockets filled with liquid, which in effect produces a double-layer cell wall with liquid between the layers thereof. The double layered wall is apparently a big factor in the operation of the cell and its capabilities. In the preparation of cells for storage and in their reconstitution, it is important that the cell walls of reconstituted embryonic cells not be ruptured and that the cell walls retain their original double layer with liquid therebetween.

It is found in accordance with this invention that when liquid is removed from the embryonic cells by the freeze drying technique, substantially the last portion of the liquid to be removed is that between the cell walls. By removing at very low temperatures, about 90 percent of the water normally present in the embryonic cells, it is found that the cells may still be preserved for long periods in an inert atmosphere or even in substantial vacuum without destroying the double wall structure of original cells. A nitrogen and/or helium atmosphere is preferred.

It is also found that when the cells either in their normal or in their freeze dried condition are subjected to light, particularly the light of the higher frequency such as the ultraviolet or blue range, that degradation occurs in their efficiency. When reconstitution of certain types of dried cells is had by water or an isotonic solution, such as Ringer's solution, there is a tendency for the cells to absorb by osmosis improper amounts of liquid, thus subjecting the cell walls to frequent rupture.

We find in accordance with an aspect of the present invention that by the use of aqueous plasma solutions of substantially the same concentration and composition as in the embryonic blood, that the tendency for rupture of the cell walls is reduced, with the result that when they are reconstituted they rival in efficiency the fresh cells immediately removed from the embryo.

Accordingly, our invention comprises the successive steps of first separating blood plasma and vital organs from the embryo of an animal and freeze-drying the plasma to remove substantially all of its water, freeze-drying the desired organ to remove about 90 percent of its water, comminuting the desired organ, storing the dried plasma and dried organ under vacuum, and reconstituting them prior to injection by admixing the dried plasma and sterile water in substantially natural proportions and then admixing the reconstituted plasma and dried cells in proportions such that a fluid suspension of cells is present for injection. By employing predetermined amounts of cells, water and plasma, the latter two steps may be carried out simultaneously in practice since the dried plasma seems to absorb water considerably more quickly than the dried cells.

In the preparation of embryonic cells of different organisms in accordance with the present invention, the embryo in the desired stage of development, preferably in the latest possible stage, is removed from the mother by Caesarean section under local anesthesia with strict surgical aseptic technique. The blood is quickly removed from the embryo through the umbilical cord by suction or negative pressure. The blood thus obtained is incorporated in a sterile bottle coated with a suitable polymeric material to prevent contact between the blood and the glass as is usual for storing blood. The blood thus obtained is treated to separate the plasma with its colloidal solution of albumen, globulin, electrolytes, and all other constituents, such as glucose, hormones, vitamins, enzymes, etc. from the cell elements (red blood cells, white blood cells and thrombocytes) and from the fibrinogen. The blood plasma is preferably cooled in an inert atmosphere as may for example be provided by liquid nitrogen or other inert gas, and dried under vacuum at low temperature. The water is substantially completely removed, by vacuum drying technique, from the plasma material thus obtained, and the dried residue powdered and retained for later use, as hereinafter described.

Immediately after removal of the blood from the embryo, the placenta and the desired organs, such as liver, spleen, bone morrow, kidney, pancreas, etc., are separated from the embryo by the same aseptic surgical technique. The separated organs are quickly frozen preferably to below 0° F., and generally below 40° or 50° F. in a liquefied inert gaseous medium, such as liquid nitrogen, and vacuum dried while being retained at the low temperature to remove about 90 percent of the natural water so that the cell walls do not collapse. The freeze-dried organ cells thus obtained are comminuted and placed into a bottle for storage in an inert atmosphere and preferably at a pressure that is well below atmospheric pressure.

The freeze-dried plasma and organ cellular materials may thus be retained for long periods of time withiut significant loss of efficiency.

The syringe package of the present invention provides preferred apparatus for storage and injection of the embryonic-organ cells. Particularly, the syringe package is provided with a vacuum storage bottle wherein the freeze-dried plasma and embryonic organ cells are stored, and a syringe member for storage of a predetermined quantity of aseptic water for admixture with the freeze dried plasma and embryo organ cells. Preparatory to injection, the water in the syringe is introduced to the freeze dried material in the vacuum bottle via the syringe needle and the mixture drawn back up through the syringe needle into the syringe in an injection-ready state.

Figure 2:
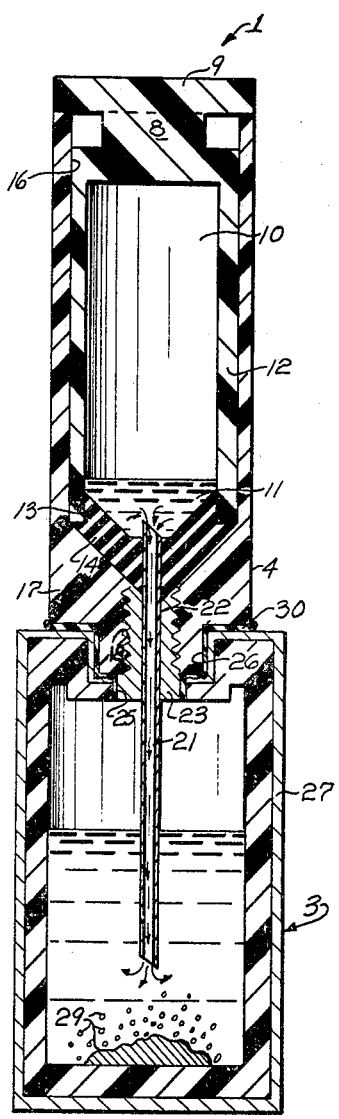
FIGURE 2 is an elevational sectional view of the syringe package shown in FIGURE 1 wherein the plasma is being mixed with the embryonic cells.
Figure 3:
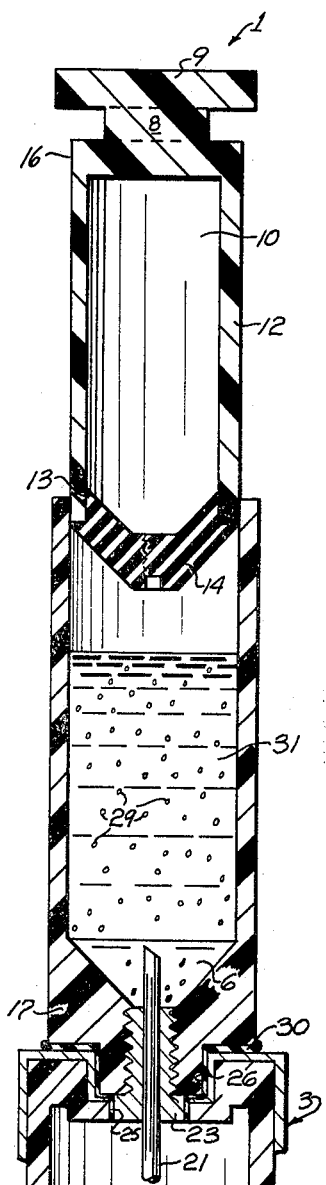
FIGURE 3 is an elevational sectional, foreshortened view of the syringe package shown in FIGURES 1 and 2 after the cell-plasma mixture has been drawn up into the syringe in a ready state for injection.

Referring in greater detail to the drawings, FIGURES 1-3 show a unitary hypodermic syringe package 1 comprised of a syringe member 2 removably mounted upon a vacuum storage bottle 3. Syringe member 2 is comprised of a syringe outer wall member 4 defining a cylindrical piston chamber 5 having a conical end portion 6. A glass cylindrical syringe piston 7 is housed in the cylindrical piston chamber 5 for reciprocal rectilinear movement along the cylindrical axis thereof.

At one end of syringe piston 7, there is provided a narrow circular neck portion 8 coaxial with the piston 7 and mounting a relatively wide cylindrical flange portion 9 also coaxial with said piston 7. The syringe piston 7 is hollow, being provided with an internal cylindrical chamber 10 for storage of sterile water 11. This water storage chamber 10 is defined by the cylindrical side walls 12 of the piston 7 and is open at the end 13 opposite that end mounting the neck portion 8 and flange portion 9. A conical rubber cap 14 is provided for mounting in the open end 13 of the piston 7 with a fluid-tight fit to contain water 11 in the water storage chamber 10.

The syringe outer wall member 4 is comprised of glass cylindrical wall portions 15, being open at the upper end 16 for reception of the syringe piston 7. The wall portions 15 at the lower end 17 of the syringe outer wall member 4 gradually thicken inwardly whereby the chamber 5 is constricted at its lower end to define the conical end portion 6 thereof. This thickened end portion 17 of the syringe outer wall member 4 is provided with a threaded aperture 18 coaxial ithe the piston chamber 5 for reception of a threaded plug 19. The threaded plug 19 is provided with an axial aperture 20 wherein is fixedly mounted a hollow needle 21. The hollow needle 21 is sharpened at both ends and extends from both ends of the plug 19, the upper end 22 extending partially up into the piston chamber 5. The threaded plug 19 is further provided with a cylindrical knurled grip portion 23 at its lower end to facilitate hand insertion or removal of the plug 19 from the receiving aperture 18. The thickened end portion 17 of the syringe outer wall member 4 is provided with a cylindrical coaxial offset portion 24 at its lowermost part to facilitate fluid-tight mounting of the syringe member 2 in the open end of vacuum storage bottle 3.

Vacuum storage bottle 3 is open at its uppermost end 25 and the inner surfaces 26 at that open end are offset to receive the offset end portion 24 of the syringe member 2. Vacuum storage bottle 3 is provided with an outer coating 27 of lead, black or highly pigmented plastic such as pigmented polyethylene or polyvinyl chloride, etc. to prevent exposure of the contents to light or other damaging radiation. Its inner surface is preferably coated with a polymeric material such as polyethylene or wax, etc. to prevent damage by contact with alkaline glass.

When the dried plasma and cellular material 29 have been properly prepared, they are sealed in the vacuum bottle 3 for storage. A predetermined amount of water is loaded into the water storage chamber 10 within the syringe piston 7, leaving an air bubble 32 of predetermined volume therewithin. The storage chamber 10 is sealed by insertion of the rubber cap 14. The syringe piston 7 is inserted into the piston chamber 5 of the syringe outer wall member 4 nearly to the end of the piston chamber 5 and far enough to cause the uppermost end 22 of the hollow needle 21 protruding up into the piston chamber 5 to engage and become partially embedded in the rubber cap 14. A circular plastic guard ring 28 is removably mounted on the narrow circular neck portion 8 at the upper end of the syringe piston 7.

The plastic guard ring 28 extends over the upper edges of the cylindrical outer wall portions 15 of the syringe outer wall member 4 to lock the piston 7 from descending further into the piston chamber 5.

Next, the dried plasma and cellular material 29 is placed in the vacuum bottle 3 which is first filled with inert gas and then partially evacuated and sealed by mounting of the syringe member 2 in the open end 25 of the bottle 3.

A thin layer of adhesive 30 having low fluid transmission properties is preferably provided as a sealant at the interface of the bottle 3 and syringe member 2. The assembled unit is illustrated at FIGURE 1 of the drawings.

At such time as it is desired to effect an injection of the cells and immediately prior thereto, the plastic guard ring 28 is removed and the piston pressed down further into the piston chamber 5. When the piston 7 has been forced down sufficiently far enough into the piston chamber 5, the sharp upper end 22 of the hollow needle 21 will pierce the rubber cap 14, entering the water storage chamber 10 of the piston 7. The syringe package 1 should be held upright during this operation so the upper end 22 of the needle 21 will emerge into the water 11 rather than into the air bubble 32 as it pierces through the rubber cap 14. When this occurs, the pressure differential existing between the negative pressure in the vacuum bottle 3 and the atmospheric pressure in the water storage chamber 10 will cause the water 11 to flow from the water storage chamber 10 into the vacuum bottle 3 via the hollow needle 21 as shown in FIGURE 2 of the drawings.

It is essential that a predetermined quantity of the water 11 be admixed with a predetermined quantity of the dried plasma in the bottle 3. Consequently, the relative capacities of the bottle 3 and water storage chamber 10 should be correlated with the quantities of dried plasma and water, with the size of the air bubble 32 within the water storage chamber, and with the pressure maintained within the vacuum storage bottle during storage. The water 11 will be quickly absorbed by the freeze-dried plasma, and the thus reconstituted plasma will in turn be absorbed by the cells 29, thereby revitalizing them.

Figure 4:
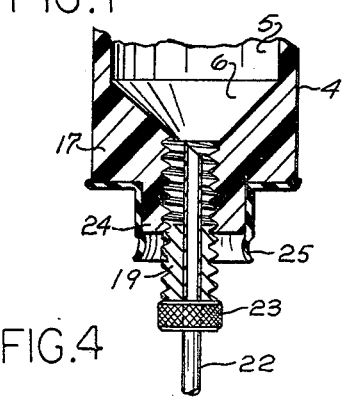
FIGURE 4 is a fragmentary, sectional view of a portion of the syringe shown in FIGURES 1, 2 and 3 showing that the syringe needle is provided with a knurled grip and is screw movable between an upper, plasma-container-puncturing position and a lower injection-ready position.

The piston 7 is then retracted from the piston chamber 5, pulling the upper end 22 of the needle 21 out of the rubber cap, and reducing pressure in the piston chamber 5. This results in a pressure differential between the piston chamber 5 and the bottle 3 chamber causing the plasma-cell solution 31 to be drawn up into the piston chamber 5 via the hollow needle 21. The syringe member 2 is then removed from the bottle 3. Subsequently, the adhesive 30 surrounding the knurled grip portion 23 of the threaded plug 19 should be peeled back slightly for access to the knurled grip 23 which is then grasped by the operator and twisted in a clockwise direction a sufficient number of turns to retract the upper end 22 of the needle 21 to a position flush with the interface of the threaded aperture 18 and the piston chamber 5 so that the opening in the upper end 22 of the needle 21 will not be obstructed by the rubber cap 14 near the end of the downward stroke of the piston 7. This is shown in FIGURE 4.

At this point, the syringe package 1 is ready for injection and the operator may proceed according to standard medical techniques for hypodermic injection. It should be noted that the rubber cap 14, having been pierced by the upper end 22 of the needle 21 tends to substantially re-seal itself upon removal of the needle 21. This is partly because the rubber of the rubber cap 14 must be compressed to admit the needle 21 and necessarily expands to fill the space left when the needle 21 is withdrawn. Further, depressions of the piston creates a pressure in the piston chamber 5 which tends to collapse the conical wall surfaces of the cap 21 to further facilitate sealing of the hole left by the needle 21. Thus, depression of the piston 7 will not result in any substantial flow-back of plasma-cell fluid 31 into the water storage chamber 10, but will cause substantially all of the plasma-cell solution 31 to be forced out of the piston chamber 5 through the hollow needle 21 for satisfactory injection.

Figure 5:
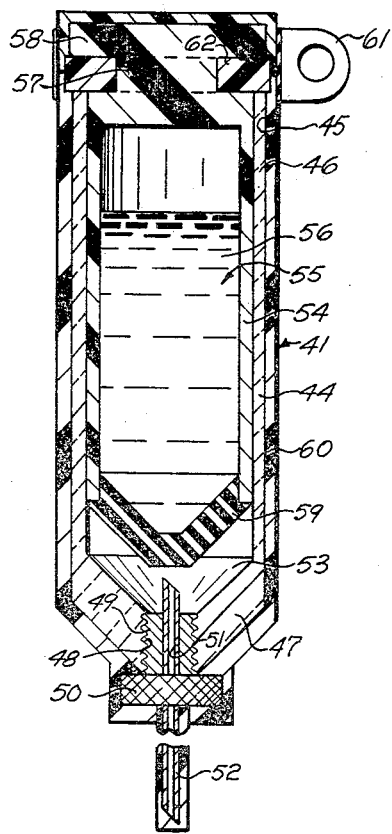
FIGURE 5 is an elevational, sectional foreshortened view of a modified syringe package in accordance with the present invention wherein the syringe and cell container are packaged separately.
Figure 5:
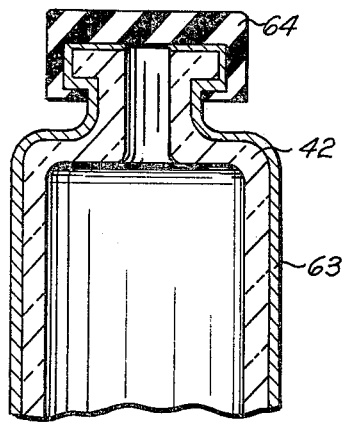
Figure 5:
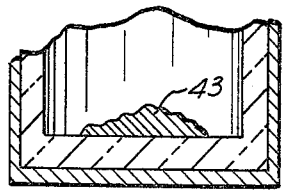

Referring to FIGURE 5, there is shown a modification of the present invention wherein the syringe member 41 and the vacuum bottle 42 storing dried plasma and cells 43 under negative pressure are provided in separate units. Here, as in the previously described embodiment (shown in FIGURES 1–4), the syringe member comprises a glass syringe outer wall member 44 having an opening 45 at the top, cylindrical side walls 46, and a conical end portion 47 at the bottom provided with a threaded aperture 48 receiving a threaded plug 49 for screw movement. The threaded plug 49 is provided with a knurled grip portion 50 at one end and is further provided with an axial aperture 51 for receiving a hollow needle 52 which is sharp at both its ends and extends from either end of the plug 49. The piston chamber defining member 44 defines a piston chamber 53 for slidable reception of a piston 54. The piston 54 is hollow, being provided with a water storage chamber 55 for air tight storage of sterile water 56.

The upper end of the piston member 54 is provided with an offset circular neck portion 57 capped by a flanged portion 58 and surrounded by a circular plastic removable guard ring 62. The lower end of the piston 54 is open to receive a conical rubber cap 59.

Unlike the embodiment illustrated in FIGURES 1–4, the entire external surface of the syringe member 41 is coated with a thin removable plastic sheath 60 provided with a tab 61 for easy removal. The sheath serves to maintain the needle 52 in a sterile condition during storage.

The vacuum bottle 42 storing treated cellular material 43 at negative pressure is coated with lead or provided with another shield 63 which may be similar to the coating 27 of the bottle 3 shown in FIGURES 1–3. However, the present bottle 42 is sealed with a rubber or plastic cap 64.

Immediately prior to injection, the plastic sheath 60 and plastic ring 62 are removed from the syringe member 41. The needle 52 is injected into the bottle 42 whereupon the reduced pressure in the bottle 42 acts to draw the water 56 out of the water storage chamber 55 and into the bottle 42 to encounter the dried plasma and cellular material 43 therein. The piston 54 is thereafter partially retracted from the piston chamber 53 to draw the plasma-cell solution out of the bottle. The needle 52 is then retracted to injection-ready position by partially unscrewing the threaded plug 49 and the syringe is ready for injection.

In the preparation of the freeze dried cells of an embryonic organ it is found that exposure to light or other radiation is harmful, especially radiation of shorter than the wave length of red light or of less than 6000 A. Therefore for optimum results, not only the dried cells but the organs themselves should not be exposed to light of appreciably less than 6000 A.

The following examples illustrate the present invention:

EXAMPLE 1

A calf embryo is removed from its mother by Caesarean section a few days before natural birth utilizing aseptic conditions. Within a few minutes, the blood is sucked from the embryo and from the placenta. In the absence of light of wave length shorter than 6000 A., the placenta and the spleen are separated from the calf embryo. A substantial amount of the embryo's bone marrow is also separated. Each of the separated organs is rapidly frozen by liquid nitrogen and subjected to high vacuum, the temperature, being maintained between −60 and −70° C. Analysis of water content is periodically maintained on small amounts of each separated material until the separated organs have a moisture content of about 10 percent based on the weight thereof.

Each of the organs is separately comminuted to a particle size such that they pass through 100 mesh screen so that when mixed with water, they can be readily passed through a number 16 hypodermic needle.

The separated blood is first incorporated into a suitable storage vessel and thereafter treated to separate red and white cells and fibrogen from the plasma in normal manner. The liquid plasma is substantially completely dried under vacuum while maintaining temperature well below 0° C. The dried plasma is pulverized.

Portions of each of the freeze dried cellular materials are placed in small glass storage vessels adapted to be evacuated and appropriately coated to exclude light of undesirable characteristics. A small amount of the dried plasma solids, sufficient when mixed with its normal water content to suspend the cells in fluid suspension, is also incorporated into each of the vacuum vessels which had been coated with lead to maintain an absence of harmful radiation. The vessels are then flushed with nitrogen to remove all traces of oxygen and evacuated to a pressure of 30 millimeters of mercury and sealed for use at a later time.

EXAMPLE 2

Three yearling southdown lambs picked at random are each subjected to whole body identical radiation of about five hundred roentgens.

One of the irradiated lambs is injected intramuscularly with a mixture of approximately 50 mg. of the freeze dried bone marrow prepared as in Example 1, 50 mg. of the spleen as prepared in Example 1, and 50 mg. of freeze dried liver prepared as was the spleen in Example 1 except the liver is substituted for spleen.

Each of these materials is suspended in 4 cc. of plasma solution prepared from the embryo blood, by separating the red and white cells and fibrogen therefrom.

Injections are given to lamb number 2 in identical manner except that the dried cells are suspended in Ringer's solution.

Lamb number 3 is given no intramuscular injection whatsoever.

The lambs are provided with the same pasture and maintained in the same enclosure. At the end of 30 days, lamb number 1 appears to be unaffected and to have subjected no ill-effects; lamb number 2 has lost considerable weight and is less active than No. 1. Lamb number 3 has died.

EXAMPLE 3

One hundred hamsters are each given identical doses of gamma radiation in amounts greater than 100 roentgens. The hamsters are then divided into four groups; each of the hamsters in one group is tagged by the letter (A), the hamsters in another group are each tagged with the letter (B); those in another group are tagged with the letter (C); and those in the last group are tagged with the letter (D).

The hamsters tagged (A) are given an intramuscular injection of one half cubic centimeter of isotonic saline solution.

The hamsters of group (B) are untreated.

The hamsters of group (C) are given an injection of a mixture of 5 miligrams of the freeze dried spleen of Example 1 and 5 milligrams of the freeze dried bone marrow of Example 1 suspended in ½ cc. of the normal plasma solution of the embryo.

The hamsters of group (D) are given an intramuscular injection of a mixture of 5 mg. of freeze dried spleen and 5 mg. of freeze dried bone marrow suspended in ½ cc. of Ringer's solution. All of the hamsters are placed in the same cage and observed.

All of the hamsters of group (A) and (B) are found to be dead within eight days.

The hamsters of group (C) appear to suffer no ill-effects and are alive and apparently healthy after the radiation. The hamsters of group (D) are also alive 60 days after radiation but appear to be lethargic and are much less active than those of group (C).

Having thus described my invention, I claim:

1. A method of preserving portions of an embryonic animal organ in a form such that it can be injected into a farm animal after lapse of substantial periods of time and such that it retains potency, comprising freeze-drying blood plasma of an embryo to remove substantially all of the natural water therefrom, freeze drying portions of an embryonic organ to remove about 85 to 95 percent of the water therefrom, comminuting the dried organ portion, incorporating said comminuted dried organ portion and said dried plasma in a closed vessel substantially void of oxygen, the amount of said dried plasma being sufficient, when mixed with that proportionate amount of water relative to plasma present in undried blood to form a suspension of cells of said organ of sufficient fluidity for injection through a hypodermic needle.

2. A method of preserving embryonic animal organs and preparing the same for hypodermic injection, comprising the steps of:
(a) removing an animal embryo from the mother by Caesarean section;
(b) extracting the blood from said embryo,
(i) separating plasma from said blood,
(ii) cooling said plasma in an inert gaseous atmosphere to at least as cool as 0° C.,
(iii) drying said plasma so cooled at substantially subatmospheric pressure by removal of substantially the entire natural water content of said plasma;
(c) (i) separating a vital organ from the said embryo and promptly cooling sadi organ to at least as cool as −20° C.,
(ii) drying said organ so cooled at subatmospheric pressure, to remove about 90 percent of the natural water of said organ,
(iii) comminuting said organ so dried and packaging portions of said dried plasma solids together with portions of said dried comminuted organ in a light-free closed container;
whereby upon adding a measured amount of water to said plasma solids and to the said portion of dried comminuted organ a fluid suspension of said organ portion is produced suitable for injection.

3. The process of claim 2 wherein the embryonic organ is maintained in the absence of appreciable radiation of shorter wave length than red light until the water is removed.

4. Embryonic animal organ cells preserved and prepared for injection by the method of claim 1.

5. Embryonic bone marrow cells preserved for intramuscular injection into an animal according to the method of claim 1.

6. Embryonic placenta cells preserved for injection into an animal according to the method of claim 1.

7. Embryonic spleen cells preserved for injection according to the method of claim 1.

8. Embryonic animal cells preserved and prepared for injection by the method of claim 2.

References Cited

UNITED STATES PATENTS 3,022,783   2/1962   Tucker _____ 128—1

FOREIGN PATENTS 1,082,782   9/1967   Great Britain.
1,092,163   11/1960   Germany.

RICHARD A. GAUDET, Primary Examiner

MARTIN F. MAJESTIC, Assistant Examiner

U.S. Cl. X.R.

128—272; 167—74